Patented Jan. 9, 1951

2,537,689

UNITED STATES PATENT OFFICE 2,537,689

POLYAMIDE RESINS

David T. Mowry and Eugene L. Ringwald, Dayton, Ohio, assignors to Monsanto Chemical Company, St. Louis, Mo., a corporation of Delaware No Drawing. Application April 15, 1948, Serial No. 21,318

12 Claims. (Cl. 260—72)

This invention relates to polyamide condensation polymers having unusual chemical and physical properties. More particularly the invention relates to novel methods of preparing linear polyamides of high molecular weight.

High molecular weight linear polyamides having regularly recurring structural components in their molecules are well known, and have a wide application in the resin industry. The known polyamides are prepared by the condensation of polyfunctional amines and polyfunctional acids, or reactive derivatives of the polybasic acids. The prior art compositions are readily distinguishable from the compositions herein disclosed both in their physical properties and in the methods of their preparation.

The primary purpose of this invention is to provide new polyamide resins, having unusual and desirable physical and chemical properties. A further purpose is to provide a method of preparing the new compounds from readily available raw materials, which resins cannot be prepared by the usual condensation reaction involving diamines and dibasic acids.

The new resinous polyamides are made by condensing formaldehyde with dinitriles containing amino groups, either in the chain connecting the two cyano radicals or on a side chain. The amino group may be either primary, secondary or tertiary, however, the tertiary amines are in general more useful. In the case where the amino group is primary or secondary the condensation with formaldehyde may result in the formation of a cross-linked insoluble polymer having limited industrial applications. Where the amino group is a tertiary radical only linear polyamides are formed.

The linear polyamides prepared from the amino dinitriles having the amino group in the straight chain between the nitrile radicals are readily condensed with formaldehyde to form polyamides of the following structure

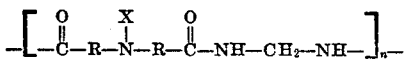

wherein R is a divalent hydrocarbon radical, n is a whole number representative of the degree of polymerization, and X is a radical of the group consisting of hydrogen, alkyl, aryl, aralkyl, and cycloalkyl radicals, said radicals containing up to 18 carbon atoms.

In accordance with this invention the linear polymethylene amides can be prepared by the condensation of formaldehyde with difunctional nitrile, such as 4-azapimelonitrile, N-ethyl-4- azapimelonitrile, N-lauryl-4-azapimelonitrile, N-stearyl-4-azapimelonitrile, N-(beta-naphthyl)-4-azapimelonitrile, N-(p-diphenyl)-4-azapimelonitrile, N-cyclopentyl-4-azapimelonitrile, N-(2-phenylethyl)-4-azapimelonitrile, and other homologues wherein the N-substituted hydrocarbon radicals contain from one to 18 carbon atoms, and the corresponding N-substituted derivatives of other aminodinitriles, for example 3-azaglutaronitrile, aminosuccinonitrile, aminophthalonitriles, aminobisbenzonitriles and dicyano derivatives of pyridine, quinoline and carbazole.

The new compositions are prepared by mixing formaldehyde, either monomeric formaldehyde or simple polymers thereof, such as para-formaldehyde, and trioxane, and the amino dinitriles in the presence of a suitable acid catalyst. The reaction may be catalyzed by any acid which has an ionization constant at least as great as that of phosphoric acid and the hydrolyzable salts of those acids. Useful catalysts in the practice of this invention are sulfuric acid, hydrochloric acid, boron trifluoride, aluminum chloride, zinc chloride, benzenesulfonic acid, toluenesulfonic acid and the half alkyl esters of sulfuric acid.

The reaction is preferably conducted by slowly combining the reagents at a low or moderate temperature which permits a rapid but not excessive reaction. The reaction temperature will depend upon the selection of the reagents and catalyst. If active catalysts and active reagents are used it is frequently necessary to add the reagents slowly and cool the reaction mass to avoid excessive reaction rates. Generally temperatures between 20° C. and 50° C. are suitable, but with less reactive catalysts it may be necessary to heat the reaction mass to temperature as high as 80° C. to effect a sufficiently complete combination of the reagents. It is often desirable to conduct the reaction in the presence of suitable mutual solvents for the various reagents, for example formic acid, glacial acetic acid, acetic anhydride or propionic acid. The presence of organic solvents, such as hexane, dioxane and benzene may minimize the precipitation of polymer during the reaction, or act as a diluent for better control of the reaction.

The new compositions are solid resinous polymers which may be prepared with a wide range of molecular weights. Many of the methylene polyamides in the linear form are water soluble, but in the cross-linked form are insoluble in water. The methylene polyamides are prepared from dinitriles having hydrocarbon substituents of substantial molecular weight are insoluble in water, but are soluble in solutions of mineral acids and organic acids.

Mixtures of the aminodinitriles and mixtures of one or more of the aminodinitriles with hydrocarbon-dinitriles, such as adiponitrile, succinonitrile, and azelaonitrile may be interpolymerized by formaldehyde to give polymers having modified solubility and thermal characteristics.

The new compositions are particularly useful as agents for increasing strength of paper, or as animalizing, sizing or finishing agents in textile manufacture. They form remoistenable films of excellent adhesion to glass, metals and wood and are useful in adhesive formulations. They may be used to increase and control the viscosity of water solutions and as dispersing agents or suspending agents for aqueous emulsions. Cross-linked water insoluble modifications are useful as cation-exchange resins.

Further details of the preparation of the new compositions are set forth with respect to the following examples.

Example 1

A 1-liter flask was charged with a solution of 123 grams of 4-azapimelonitrile and 31.6 grams of trioxane in 300 ml. of formic acid. After cooling the mixture to 0° C., 310 grams of concentrated sulfuric acid was added with stirring while maintaining the flask immersed in an ice bath. After the reaction was complete the mixture was permitted to increase in temperature to 25 to 30° C., and the stirring was continued for three hours. The resulting syrup was poured into 1-liter of water and while cooling in an ice bath the mixture was neutralized with 20 percent sodium hydroxide. The polymer precipitated as an oil layer, was separated from the water layer and finally dried in a vacuum oven at 55° C. The solid polymer was identified as polymethylene-4-azapimelamide. It was found to be soluble in water, alcohol and acetone.

Example 2

Using a procedure similar to that described in the preceding example, 123 grams of 4-azapimelonitrile and 45 grams of trioxane were reacted in the presence of 300 ml. of glacial acetic acid while maintaining a temperature of 0° C. The reaction was effected by adding 270 grams of concentrated sulfuric acid over a period of about ten minutes. After all the acid had been added the temperature rose rapidly to 110° C. to 130° C. The contents of the flask immediately gelled. The solid mass was broken up and washed with water in a high speed disintegrator. The polymer was filtered and dispersed in a dilute alkali solution for several hours. After filtering and washing a hard granular substance was obtained which was insoluble in water. The polymer was identified as polymethylene-4-azapimelamide, and appeared to be a cross-linked modification of the polymer prepared by the method of the preceding example.

Example 3

A 2-liter flask was charged with 151 grams of 4-ethyl-4-azapimelonitrile, 42 grams of trioxane and 600 ml. of 98 percent formic acid. After all of the reagents had dissolved to form a clear solution it was cooled to 0° C. and 300 grams of concentrated sulfuric acid were added during a ten minute period. The stirring was continued for a two and one-half hour period and the resulting viscous liquid was poured into water. The white polymeric mass was precipitated when neutralized with dilute sodium hydroxide. The water soluble resin so obtained was identified as polymethylene-N-ethyl-4-azapimelamide.

Example 4

A 1-liter reaction flask was charged with a solution of 89.5 grams of 4-butyl-4-azapimelonitrile, 15.75 grams of trioxane, and 150 ml. of 98 percent formic acid. The cool solution was then treated by gradually adding 155 grams of concentrated sulfuric acid. After the reagents had been combined the stirring was continued for three hours at 25 to 30° C. The polymer was identified as polymethylene-N-butyl-4-azapimelamide.

Example 5

Polymethylene - N - benzyl - 4 - azapimelamide was prepared from di-4-benzyl-4-azapimelonitrile by reaction with trioxane in the presence of sulfuric acid. This polymer was soluble in organic solvents and dilute mineral acids.

Example 6

Using the procedures and examples described in the preceding examples, 102.5 grams of 4-cyclohexyl-4-azapimelonitrile was reacted with 15.4 grams of trioxane in the presence of a mixture of formic acid and sulfuric acids. The temperature rose to 90° C. during the reaction and after cooling was poured into water to precipitate a polymeric substance identified as polymethylene-4-cyclohexyl-4-azapimelamide.

Example 7

4-phenyl-4-azapimelonitrile was first prepared by condensating aniline with 2 mols of acrylonitrile. A 17.1 gram quantity of this aminonitrile was reacted with 2.7 grams of trioxane in the presence of 55.1 ml. of 98 percent formic acid. After the reaction had been cooled to 0° C., 26 grams of concentrated sulfuric acid were gradually added. The stirring was continued for three hours at temperatures of 25 to 30° C. The polymer separated from the solution in the manner described in Example 3, was polymethylene-4-phenyl-4-azapimelamide.

Example 8

Piperidinosuccinonitrile, prepared by the reaction of piperidine and fumaronitrile in dioxane solution, was reacted with a mixture of formic acid and concentrated sulfuric acid. The hard, brittle resin so obtained was found to be soluble in mineral acids.

Example 9

A substituted aminodinitrile was prepared by reacting 4-azapimelonitrile with p-toluenesulfonyl chloride in the presence of aqueous sodium hydroxide. The resulting N-p-toluenesulfonyl-4-azapimelonitrile (34.6 g.) was reacted with 3.9 grams of trioxane in the presence of 150 ml. of 98 percent formic acid and 50 grams of concentrated sulfuric acid. After combining the reagents the resulting solution was stirred for four hours. By pouring the viscous solution so obtained in an excess of water a white polymeric substance was obtained which was identified as polymethylene - N-p-toluenesulfonyl-4-azapimelamide.

Example 10

A 500 ml. flask was charged with a solution of 18.9 grams of ethyl-4-azapimelonitrile, 18.75 grams of azelaonitrile, and 7.7 grams of trioxane in 200 ml. of 98 percent formic acid. After cooling the mixture to 15° C. and maintaining the mixture between 5° and 20° C., 100 grams of concentrated sulfuric acid was added. After stirring for two hours the reaction mass was poured into water and neutralized wtih sodium hydroxide. The precipitated polymer was washed and dried in a vacuum oven. This polymer was a copolymer of equal molar proportions of the two dinitriles. The acid soluble copolymer was found capable of forming fibers.

*Example 11*

Using the procedure described in the preceding example, 80 mol percent of azelaonitrile and 20 mol percent of the N-ethyl-4-azapimelonitrile were reacted with a stoichiometric proportion of trioxane. This copolymer was a tough, resinous substance and capable of being melt spun to form useful fibers.

Although the invention has been described with respect to specific embodiments, it is not intended that the details thereof shall be construed as limitations upon the scope of the invention except to the extent incorporated in the following claims.

We claim:

1. A resinous composition having the structural formula:

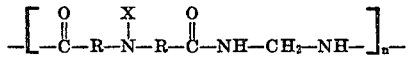

wherein R is a divalent aliphatic hydrocarbon radical, n is a whole number representative of the degree of polymerization, and X is a radical of the group consisting of alkyl, aryl, aralkyl, and cycloalkyl radicals, said radicals containing up to 18 carbon atoms.

2. A method of preparing resinous compositions, which comprises mixing formaldehyde and a nitrile having the structure:

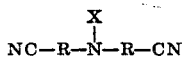

wherein R is a divalent aliphatic hydrocarbon radical, and X is a radical containing up to 18 carbon atoms of the group consisting of alkyl, aryl, aralkyl and cycloalkyl radicals, said mixing operation being performed at a temperature not exceeding 80° C., and taking place in a substantially anhydrous medium in the presence of a compound of the group consisting of acids having ionization constants at least as great as that of phosphoric acid and the hydrolyzable salts of said acids, and contacting the resulting compound with water.

3. The method defined by claim 2, wherein the dinitrile is 4-ethyl-4-azapimelonitrile.

4. The method defined by claim 2, wherein the dinitrile is 4-butyl-4-azapimelonitrile.

5. The method defined by claim 2, wherein the dinitrile is 4-benzyl-4-azapimelonitrile.

6. The method defined by claim 2, wherein the dinitrile is 4-phenyl-4-azapimelonitrile.

7. The method defined by claim 2, wherein the dinitrile is 4-cyclohexyl-4-azapimelonitrile.

8. Poly(methylene-4-ethyl-4-azapimelamide).

9. Poly(methylene-4-butyl-4-azapimelamide).

10. Poly(methylene - 4 - benzyl - 4 - azapimelamide).

11. Poly(methylene-4-phenyl - 4 - azapimelamide).

12. Poly(methylene-4 - cyclohexyl-4-azapimelamide).

DAVID T. MOWRY.
EUGENE L. RINGWALD.

REFERENCES CITED

The following references are of record in the file of this patent:

UNITED STATES PATENTS

| Number | Name | Date |
|---|---|---|
| 2,096,181 | Jahrstorfer | Oct. 19, 1937 |
| 2,228,271 | Jacobson | Jan. 14, 1941 |
| 2,317,736 | D'Alelio | Apr. 27, 1943 |
| 2,359,708 | Bruson | Oct. 2, 1944 |

FOREIGN PATENTS

| Number | Country | Date |
|---|---|---|
| 506,393 | Great Britain | May 25, 1939 |